(12) United States Patent
Zuniga et al.

(10) Patent No.: US 7,471,713 B2
(45) Date of Patent: Dec. 30, 2008

(54) ORTHOGONAL VARIABLE SPREADING FACTOR (OVSF) CODE ASSIGNMENT

(75) Inventors: Juan Carlos Zuniga, Montreal (CA); Ana Lucia Iacono, Garden City, NY (US); Janet Stern-Berkowitz, Little Neck, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 12/124,716

(22) Filed: May 21, 2008

(65) Prior Publication Data

US 2008/0219221 A1    Sep. 11, 2008

Related U.S. Application Data

(63) Continuation of application No. 10/622,681, filed on Jul. 18, 2003, now Pat. No. 7,379,489.

(60) Provisional application No. 60/399,864, filed on Jul. 31, 2002, provisional application No. 60/396,822, filed on Jul. 18, 2002.

(51) Int. Cl.
*H04B 1/00* (2006.01)
(52) U.S. Cl. .................................. 375/130
(58) Field of Classification Search ............... 375/130, 375/141, 146, 295; 370/210, 329, 342, 348, 370/345, 350, 437, 443, 465; 455/450, 452.1, 455/452.2
See application file for complete search history.

(56) References Cited

U.S. PATENT DOCUMENTS

| | | | |
|---|---|---|---|
| 6,091,757 A | 7/2000 | Cudak et al. | |
| 6,163,524 A | 12/2000 | Magnusson | |
| 6,222,875 B1 | 4/2001 | Dahlman et al. | |
| 6,233,231 B1 * | 5/2001 | Felix et al. | 370/335 |
| 6,400,755 B1 * | 6/2002 | Harris et al. | 375/146 |
| 6,526,065 B1 | 2/2003 | Cheng | |
| 6,552,996 B2 | 4/2003 | Kim et al. | |
| 6,680,902 B1 * | 1/2004 | Hudson | 370/210 |
| 6,885,653 B2 * | 4/2005 | Choi et al. | 370/342 |
| 6,907,060 B2 * | 6/2005 | Yang | 375/141 |
| 6,934,526 B2 | 8/2005 | Choi et al. | |
| 7,020,176 B2 * | 3/2006 | Heo | 375/130 |
| 7,164,650 B2 | 1/2007 | Kim et al. | |

(Continued)

FOREIGN PATENT DOCUMENTS

EP    1 035 676    9/2000

(Continued)

OTHER PUBLICATIONS

Chen et al., "A Novel Code Assignment Scheme for W-CDMA Systems," IEEE Vehicular Technology Conference, vol. 2, Oct. 2001, pp. 1182-1186.

(Continued)

*Primary Examiner*—Khanh C Tran
(74) *Attorney, Agent, or Firm*—Volpe and Koenig, P.C.

(57) ABSTRACT

The invention includes a system and methods for orthogonal variable spreading factor (OVSF) code assignment, de-allocation and code tree pruning. The invention also includes OVSF code identification and storage schemes. Embodiments are provided for code tree pruning, code assignment and de-allocation. These embodiments apply to both slotted and non-slotted code division multiple access systems.

17 Claims, 14 Drawing Sheets

U.S. PATENT DOCUMENTS

| | | | |
|---|---|---|---|
| 7,239,604 B2 * | 7/2007 | Kim et al. | 370/209 |
| 2002/0037015 A1 * | 3/2002 | Shanbhag | 370/441 |
| 2002/0051437 A1 * | 5/2002 | Take | 370/335 |

FOREIGN PATENT DOCUMENTS

| | | |
|---|---|---|
| JP | 09-037337 | 2/1997 |
| JP | 11-266480 | 9/1999 |
| WO | 00/42723 | 7/2000 |
| WO | 00/54444 | 9/2000 |

OTHER PUBLICATIONS

Cheng et al., "OVSF Code Channel Assignment for IMT-2000", IEEE Vehicular Technology Conference Proceedings, 2000 Spring Tokyo, vol. 3, May 2000, pp. 2188-2192.

Minn et al., "Dynamic Assignment for Orthogonal Variable-Spreading-Factor Codes in W-CDMA," IEEE Selected Areas in Communications Journal, vol. 18, Issue 8, Aug. 2000, pp. 1429, 1440.

Tseng et al., "Code Placement and Replacement Strategies for Wideband CDMA OVSF Code Tree Management," Globecom '01, IEEE Global Telecommunications Conference, vol. 1 of 6, Nov. 25, 2001, pp. 562-566.

* cited by examiner

US 7,471,713 B2

ORTHOGONAL VARIABLE SPREADING FACTOR (OVSF) CODE ASSIGNMENT

CROSS REFERENCE TO RELATED APPLICATION(S)

This application claims priority from U.S. provisional application No. 60/396,822, filed Jul. 18, 2002, U.S. provisional application No. 60/399,864 filed Jul. 31, 2002, and is a continuation of U.S. patent application Ser. No. 10/622,681 filed Jul. 18, 2003, became U.S. Pat. No. 7,379,489, which are incorporated by reference as if fully set forth.

FIELD OF INVENTION

This invention generally relates to wireless communication systems. In particular, the invention relates to code assignment is such systems.

BACKGROUND

In code division multiple access (CDMA) communication systems, communications are sent over a shared frequency spectrum. To minimize cross interference between the transmitted signals, orthogonal codes are used. Communications transmitted with orthogonal codes through an ideal wireless channel experience no cross code correlation, although in practice due to multipath, the orthogonal nature of the codes may break down to some extent.

FIG. 1 is an illustration of a code tree for orthogonal variable spreading factors (OSVF). At the top of the tree is a code for a spreading factor of one. Codes in each row further down the tree have a spreading factor twice the factor of the row above that code. For the code tree of the time division duplex (TDD) mode of a third generation partnership project (3GPP) wideband code division multiple access (WCDMA) communication system, the maximum spreading factor as shown in FIG. 1 is sixteen (16). In other systems, the maximum spreading factor may be significantly larger, such as 256 or 512.

FIG. 1 is an illustration of an OVSF code tree having a maximum spreading factor of 16. The tree has one code of spreading factor 1, C1(1) of a value "1". Two codes, C2(2) having a value of "1,1" and C2(1) having a value of "1,-1", have a spreading factor of 2. Four codes, C4(4) to C4(1), have a spreading factor of 4. Eight codes, C8(8) to C8(1) have a spreading factor of 8 and sixteen codes, C 16(16) to C16(1) have a spreading factor of 16.

The lines connecting the codes in the tree identity codes that are not orthogonal to each other in the tree. Codes connected by lines in either only an upward or downward direction are not orthogonal. To illustrate, code C16(16) is not orthogonal to code C2(2), since tracing a path from code C16(16) to code C2(2) can be done using four upward connecting lines. Conversely, codes C16(16) and C8(7) are orthogonal to each other. Tracing a path from C16(16) to C8(7) involves using two upward connecting lines and one downward connecting line.

To minimize interference between communications, it is desirable to only assign codes that are orthogonal to each other. It is also desirable to assign the codes in an optimal manner such that the maximum number of orthogonal codes are available for use. In an operating wireless communication system as codes are assigned and release, unoptimal code assignments may occur reducing the system's capacity.

FIG. 2A is an illustration of an unoptimal OVSF code assignment. One problem with using OVSF codes is the efficient use of the codes. After the assigning and release of codes, codes C16(16), C16(13), C16(9) and C16(5) are still active, as show as being filled circles. To prevent the assignment of a code not orthogonal to these codes, all the codes above these codes are blocked from assignment, as shown by an "X". Accordingly, the use of C16(5) blocks C8(3), C4(2), C2(1) and C1(1). As shown in FIG. 2A, a total of ten codes are blocked, C1(1), C2(1), C2(2), C4(2), C4(3), C4(4), C8(3), C8(5), C8(7) and C8(8) are blocked. As a result of assigning four spreading factor (SF) sixteen codes, no SF 2 codes are available and only one SF4 code is available. Accordingly, services requiring an SF 2 code or multiple SF 4 codes can not be supported.

FIG. 2B illustrates and efficient assignment of four SF16 codes. Codes C16(16) to C16(13) are used. Only five codes are blocked as a result of this assignment, codes C1(1), C2(2), C4(4), C8(8) and C8(7). As a result, one SF 2 code is available and three SF 4 codes are available to support additional services. The assignment of FIG. 2B allows for greater latitude in code assignment than FIG. 2A.

Accordingly, it is desirable to have alternate approaches to code assignment.

SUMMARY

The invention includes a system and methods for orthogonal variable spreading factor (OVSF) code assignment, de-allocation and code tree pruning. The invention also includes OVSF code identification and storage schemes. Embodiments are provided for code tree pruning, code assignment and de-allocation. These embodiments apply to both slotted and non-slotted code division multiple access systems.

BRIEF DESCRIPTION OF THE DRAWING(S)

DETAILED DESCRIPTION OF THE PREFERRED EMBODIMENT(S)

Hereafter, a wireless transmit/receive unit (WTRU) includes but is not limited to a user equipment, mobile station, fixed or mobile subscriber unit, pager, or any other type of device capable of operating in a wireless environment.

Figure 1:
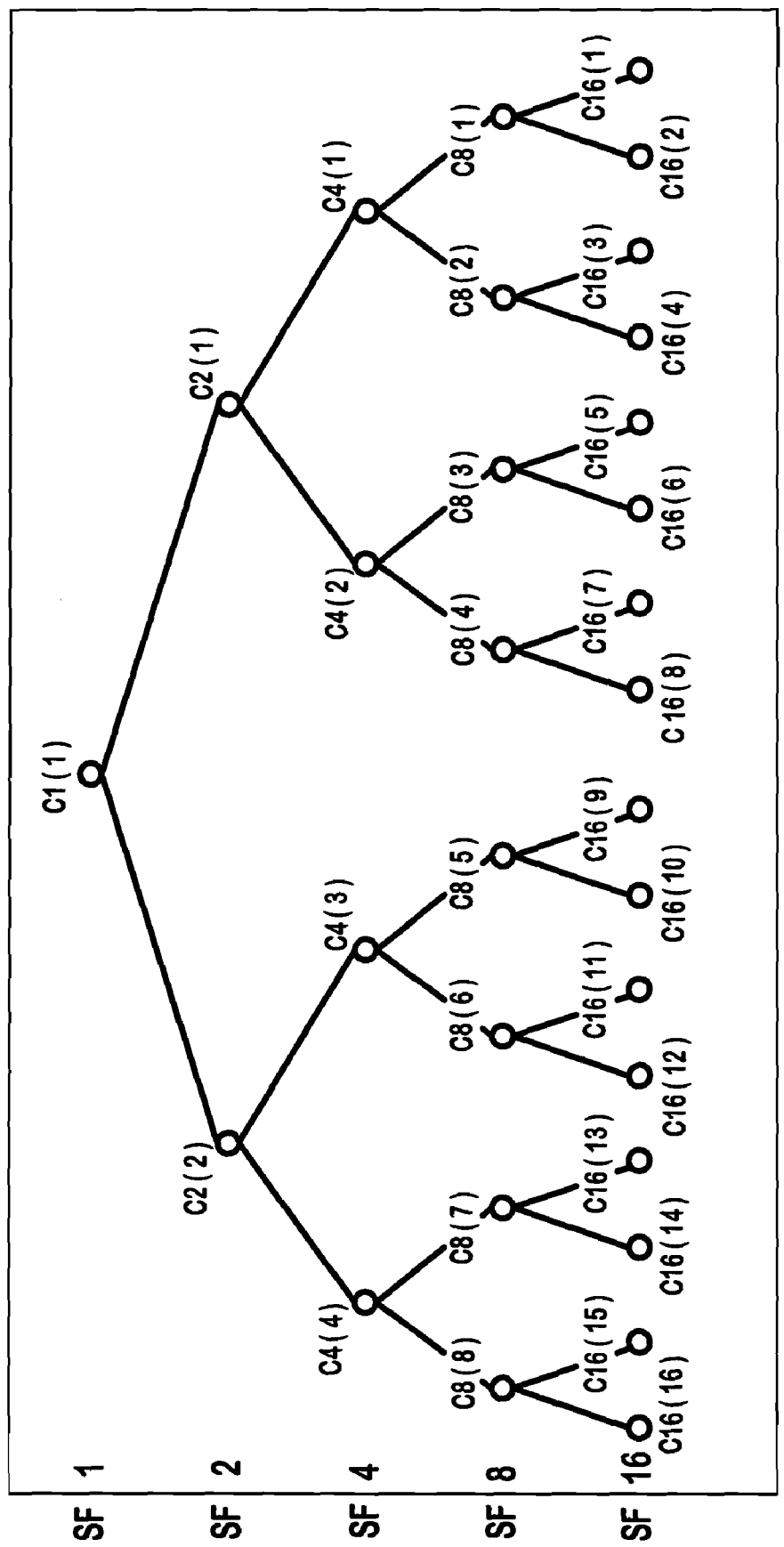
FIG. 1 is an illustration of a OVSF code tree.
Figure 2A:
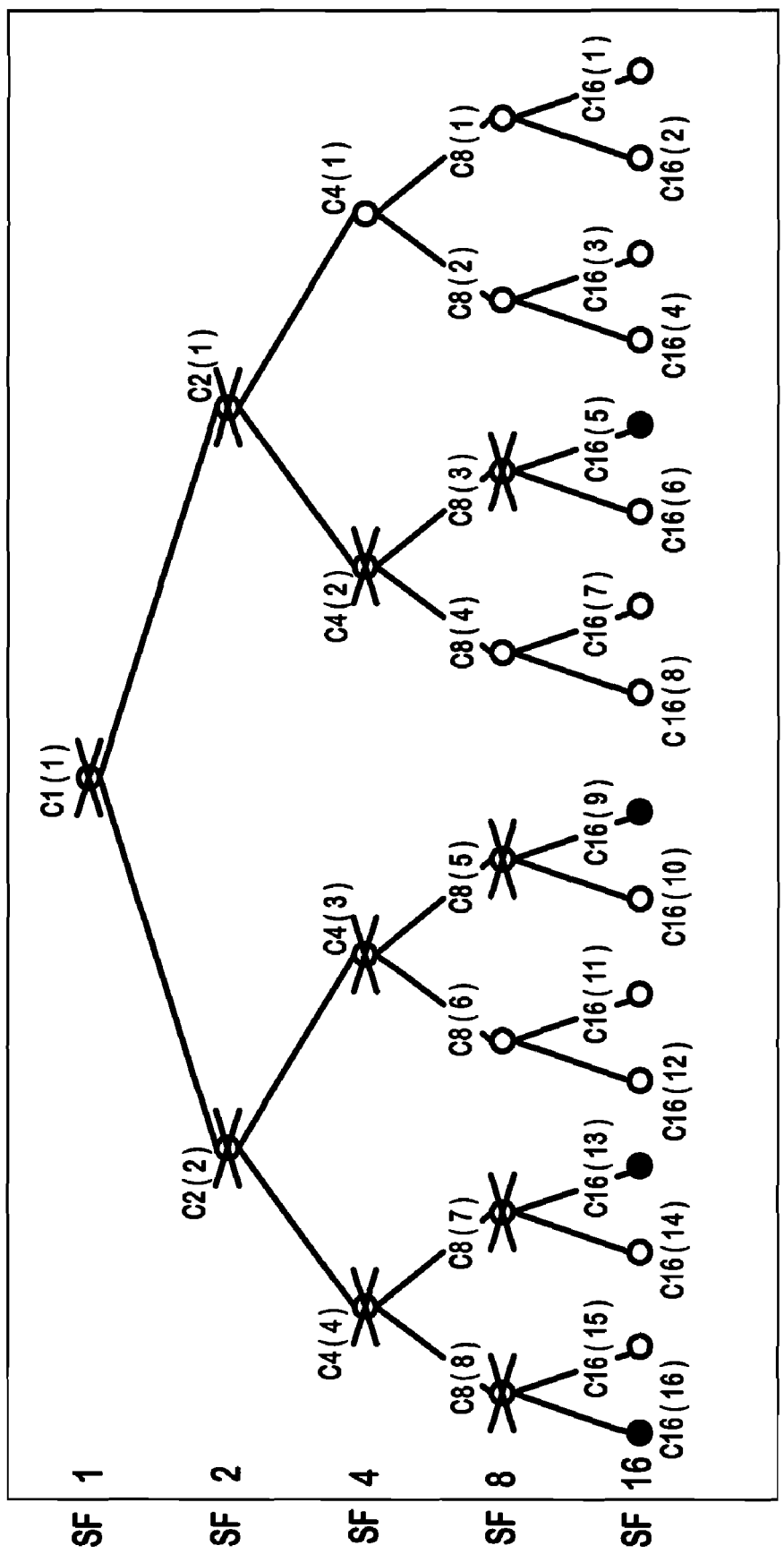
FIGS. 2A and 2B are illustrations of code allocations and the resulting blocked codes.
Figure 2B:
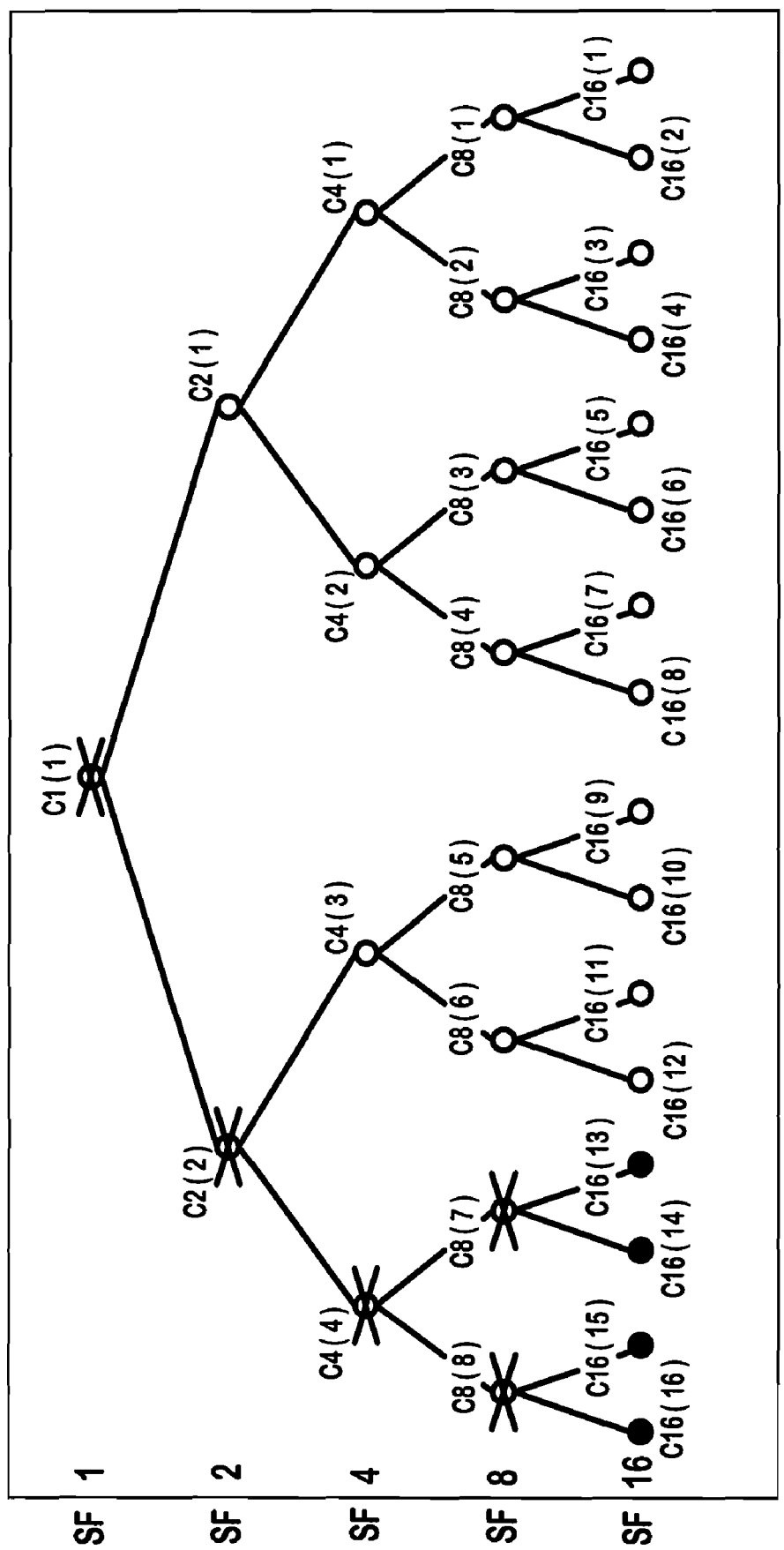
Figure 3:
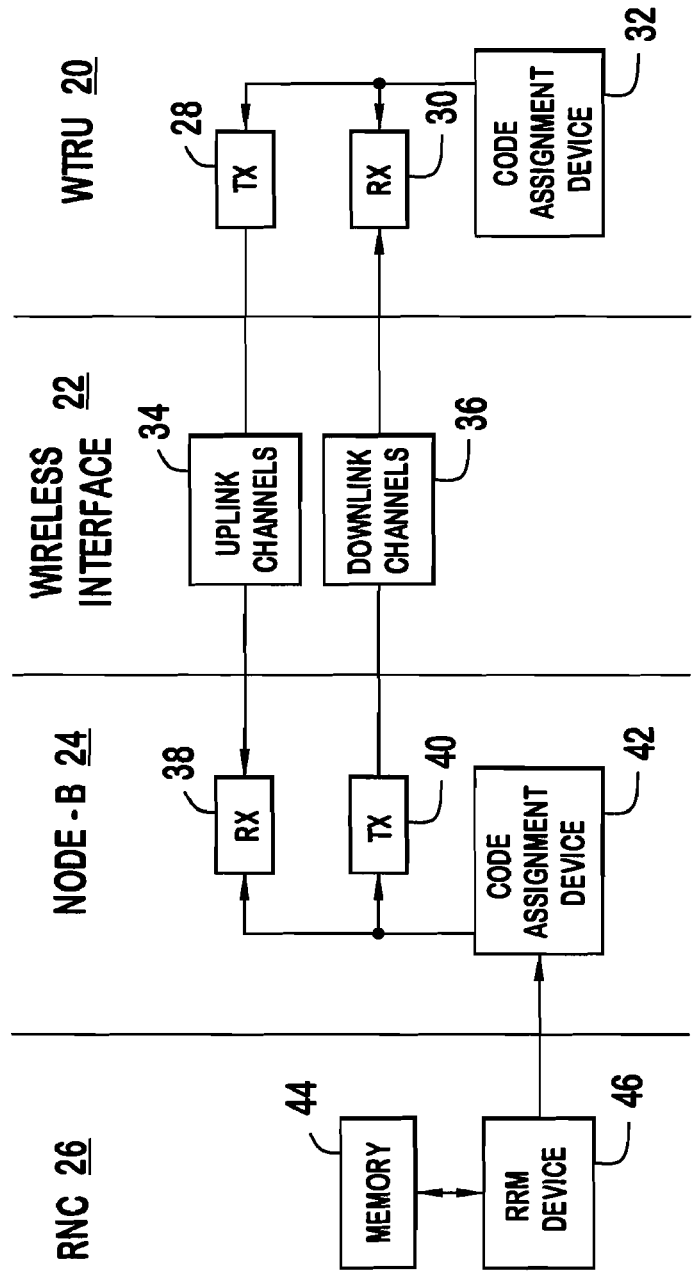
FIG. 3 is a simplified block diagram of a OVSF code assignment system.

FIG. 3 is a simplified diagram of a wireless communication system using OSVF code assignment. A radio network controller (RNC) 26 has a radio resource management (RRM) device 46 for use in assigning and releasing codes. The RRM device 46 has an associated memory for use in storing the code assignments and other information. A Node-B has a code assignment device 42 which receives the resource allocation from the RRM device 46. The code assignment device 42 assigns codes to the uplink, downlink or both communications. A transmitter (TX) 40 uses the downlink code assignments to transfer communications through the downlink channel(s) 36 of the wireless interface 22. A receiver (RX) 38 uses the uplink code assignments to receive communications over the uplink channel(s) 34. A WTRU 20 has a code assignment device 32 for assigning uplink and downlink codes. The code assignments may be signaled from the RRM device 46 to the WTRU 20. The TX 28 uses the uplink code assignments to send uplink communications and the RX 30 uses the downlink code assignments to receive downlink communications.

Figure 4:
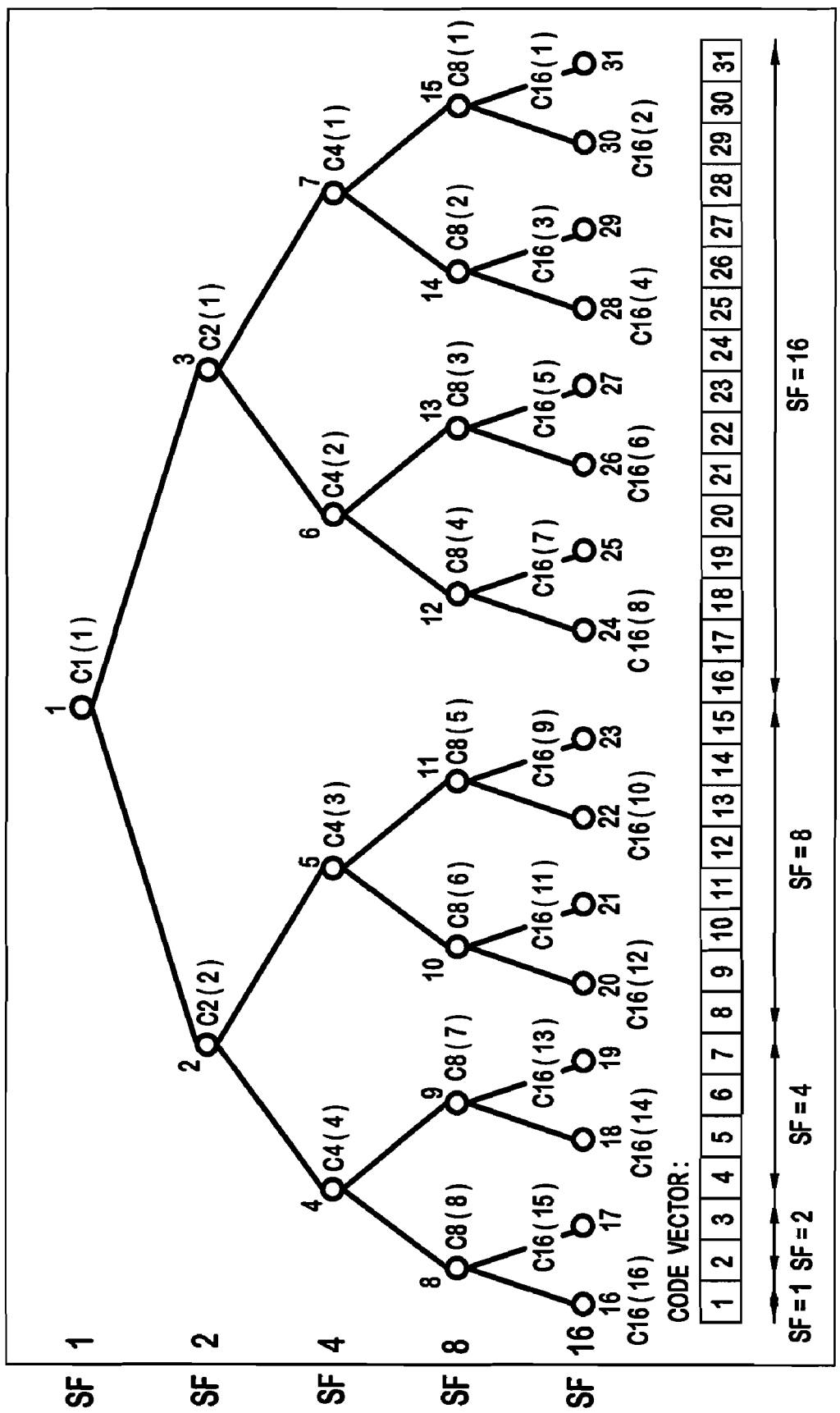
FIG. 4 is a preferred OVSF code identification scheme.

The following are embodiments for assigning and/or reassigning OSVF codes. FIG. 4 is an illustration of a preferred technique for identifying the codes of the code tree. In the technique of FIG. 4, the codes are identified as sequential numbers. The spreading factor 1 code, C1(1), is identified as 1. The spreading factor 2 codes are identified as: C2(2) as 2 and C2(1) as 3. The spreading factor 4 codes are identified as: C4(4) as 4, C4(3) as 5, C4(2) as 6, C4(1) as 7. The spreading factor 8 codes are identified as: C8(8) as 8, C8(7) as 9, C8(6) as 10, C8(5) as 11, C8(4) as 12, C8(3) as 13, C8(2) as 14 and C8(1) as 15. The spreading factor 16 codes are identified as: C16(16) as 16, C16(15) as 17, C16(14) as 18, C16(13) as 19, C16(12) as 20, C16(11) as 21, C16(10) as 22, C16(9) as 23, C16(8) as 24, C16(7) as 25, C16(6) as 26, C16(5) as 27, C16(4) as 28, C16(3) as 29, C16(2) as 30 and C16(1). For systems using spreading factors larger than 16, such as FDD/CDMA, the code tree can be expanded accordingly. Although FIG. 4 illustrates one number scheme other versions may be used. To illustrate the sequential numbering across the rows may be done from right to left or in another order.

Figure 5:
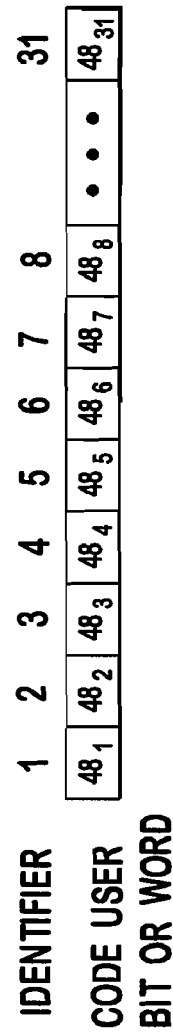
FIG. 5 is an illustration of a code vector.

As shown at the bottom of FIG. 4, the sequential code identifiers can be grouped by spreading factor and remain in sequence. To illustrates, SF 16 code identifiers are identifiers 16 to 31. The use of such a code identifier technique allows for reduced storage space for code assignments. FIG. 5 is an illustration of such a code assignment storage. Each code identifier, 1 to 31, has an associated bit or word $48_1$ to $48_{31}$ to indicate the current status of the code, such as being "currently assigned", "blocked" or "available". A "blocked" code is a code that cannot be assigned due to another "currently assigned" code. To illustrate, C8(1) is blocked if either C16(1), C16(2), C4(1), C2(1) or C(1) is being used. Additional status information may be provided, such as an indicator of the number of blocking codes may also be provided.

This code identification storage approach allows for essentially a concise vector to contain the code assignment information, instead of utilizing some form of list or table. However, the following code assignment approaches can be used or adapted for use with a vector, table, list or other storage techniques.

One preferred code status word uses a two bit element. The first bit indicates if the code is blocked. A "0" indicates that the code is not blocked and a "1" indicates that the code is blocked. The second bit indicates if the code is blocked by one code in its sub-tree or both codes in the sub-tree. A "0" indicates one code and a "1" indicates two codes. For example, if code 8 is used and code 9 is free, then code 4 is blocked by one code only, and it is marked as "10"; if codes 8 and 9 are used, then code 4 is blocked by both codes in its sub-tree, and it is marked as "11". If a code is being used currently, it is marked as "11". "01" preferably indicates that the code cannot be used in that timeslot.

Figure 6:
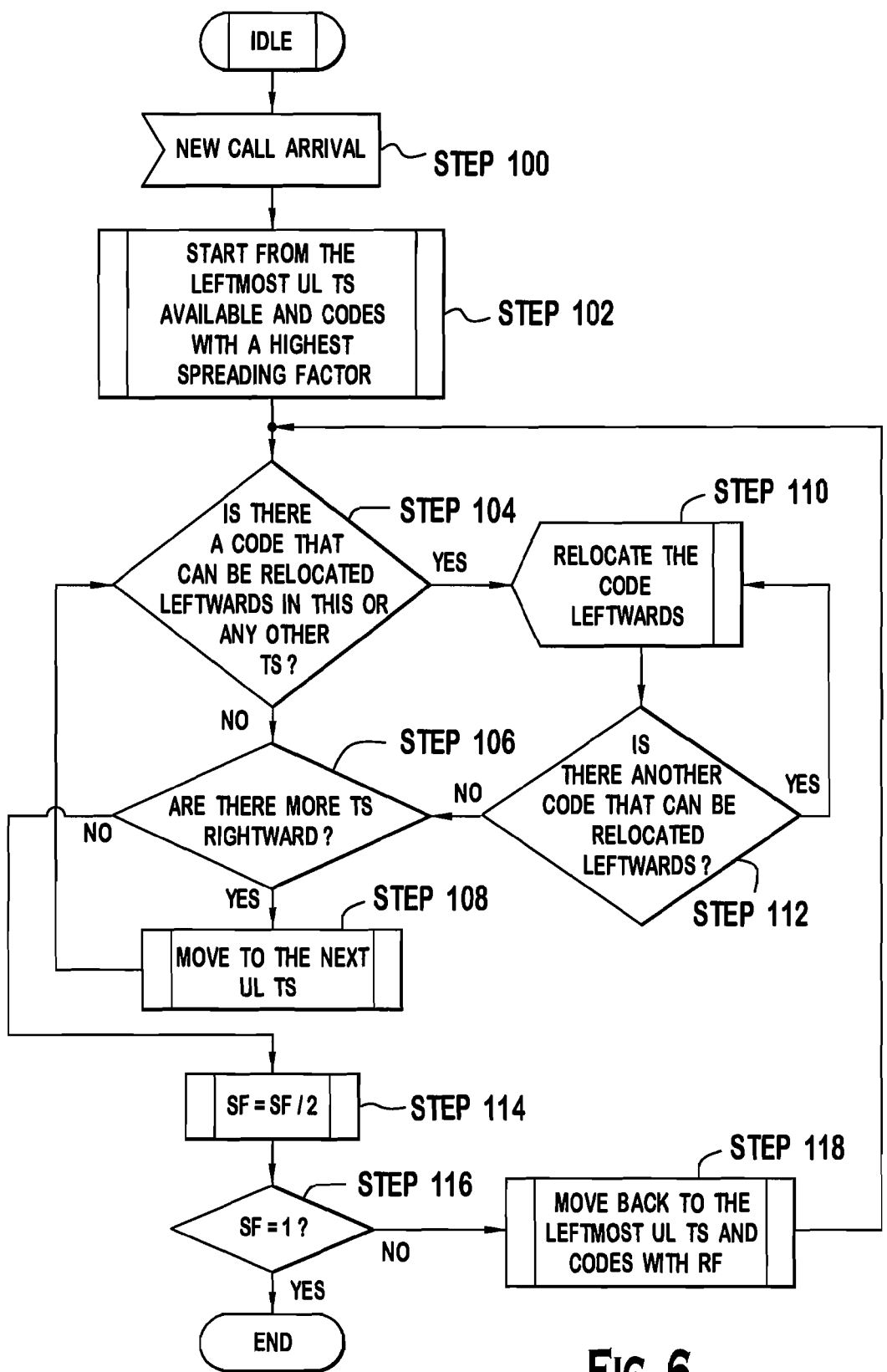
FIG. 6 is a flow chart for OVSF code tree pruning over multiple time slots.

FIG. 6 is a preferred tree pruning approach for use in slotted CDMA communication systems, such as in TDD/CDMA. Tree pruning is a reassignment of codes to allow for more flexibility in future code assignments. Although the following describes code pruning in a left to right fashion, other code assignment orders can be used such as right to left among others.

A new call is to be added and codes are assigned to the call, step 100. The pruning is begun with a first time slot of set of timeslots for potential assignment and reassignment. To illustrate, in a TDD/CDMA system in which slots 2, 4, 6 and 10 may be used for uplink transmissions, slot 2 could be deemed the first slot, slot 4 the second and so on. The leftmost available code of the highest spreading factor (SF) in that time slot is evaluated, step 102. If there are no codes of that SF available in the first time slot, subsequent time slots are searched until a code is found. Although the flow chart of FIG. 6 is described as by moving from a highest to lowest spreading factor, the differing spreading factors can be processed from lowest to highest or in another order.

After a code is found, a highest SF code in any time slot that can be moved left into this time slot is determined, step 104. That determined code is relocated leftwards, step 110. If other codes can be moved leftwards, these codes are also relocated, step 112. The relocation procedure is repeated for the next time slot, steps 106 and 108. If there are no time slots that have not been evaluated, the leftward relocation is performed for the next higher spreading factor, steps 114 and 118. This process is repeated until the lowest spreading factor is reached, such as SF 1, step 116. Codes having a SF of 1 are preferably not relocated and the process ends.

The algorithm of FIG. 6 is preferably invoked for after every new call. The algorithm, in summary, starts pruning the trees with the lowest layer codes and from the rightmost timeslot and code. If a code can be reallocated to any other place to the left, the code is moved. After all the possible codes in the lowest layer are moved, the algorithm moves up one level and repeats the same procedure. It continues until one layer before the highest is reached (i.e. in the TDD case, codes with SF1 typically do not need to be reallocated).

Figure 7:
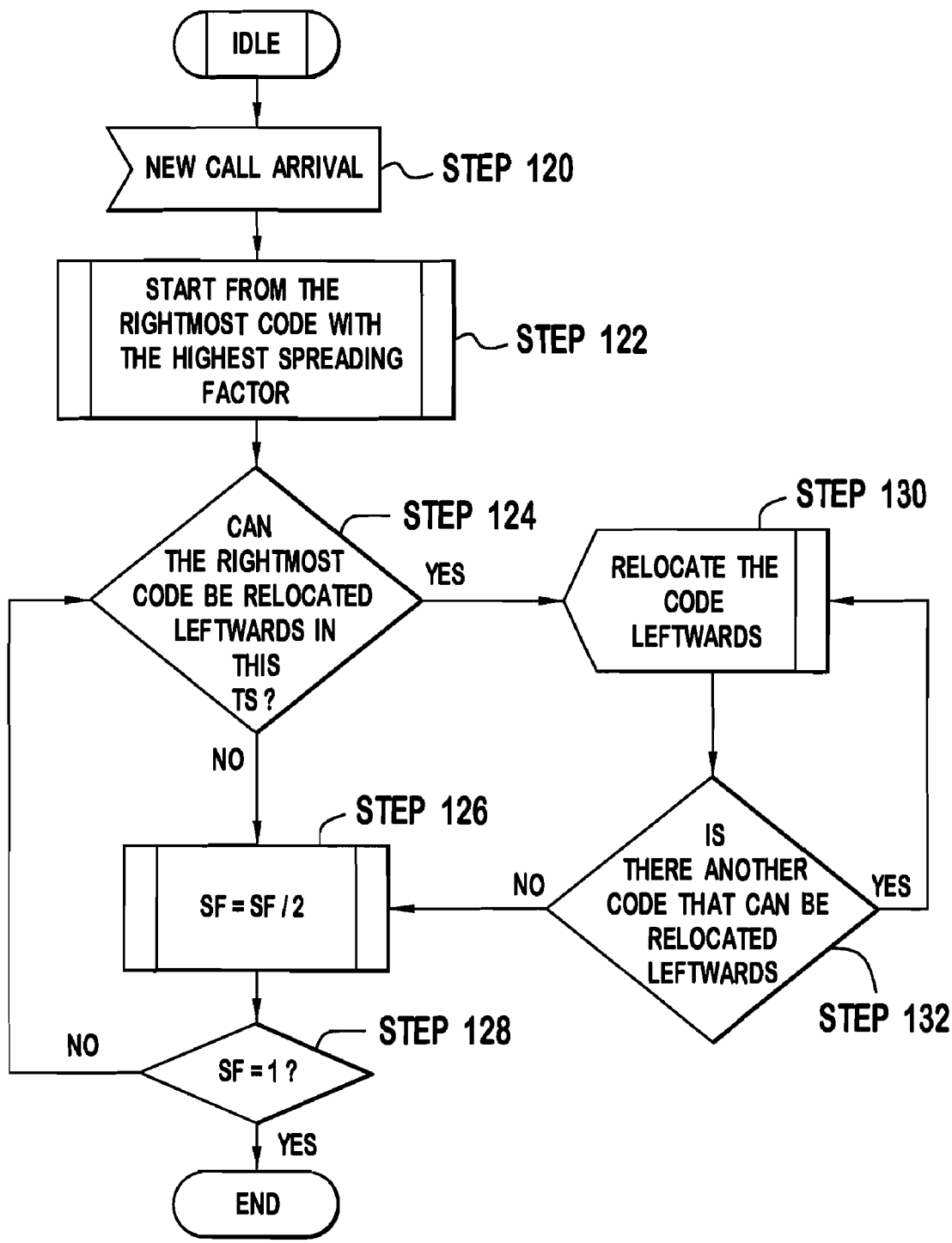
FIG. 7 is a flow chart for OVSF code tree pruning.

Another approach, as per FIG. 7, limits the tree pruning to pruning within individual time slots. This code approach can be applied also to non-slotted system as well. After the new call is assigned a code, step 120, the rightmost code with a highest SF is selected, step 122. If the rightmost highest SF code can be relocated leftward, step 124, the code is relocated leftward, step 130. If another highest SF code can be relocated leftward, step 132, it is relocated, step 130. The leftward relocating is repeated for each lower spreading factor in order, step 126. After the lowest SF is reached, such as SF 1, step 128, the procedure is ended.

In summary, after every new arrival, the algorithm of FIG. 7 is invoked. The algorithm starts pruning the tree with the lowest layer codes and from the rightmost code. If a code can be reallocated to any other place to the left, the code is moved. In the preferred approach, each code is reallocated as far to the left as possible. After all the possible codes in the lowest layer are moved, the algorithm moves up one level and repeats the same procedure. It continues until one layer before the highest is reached.

Figure 8:
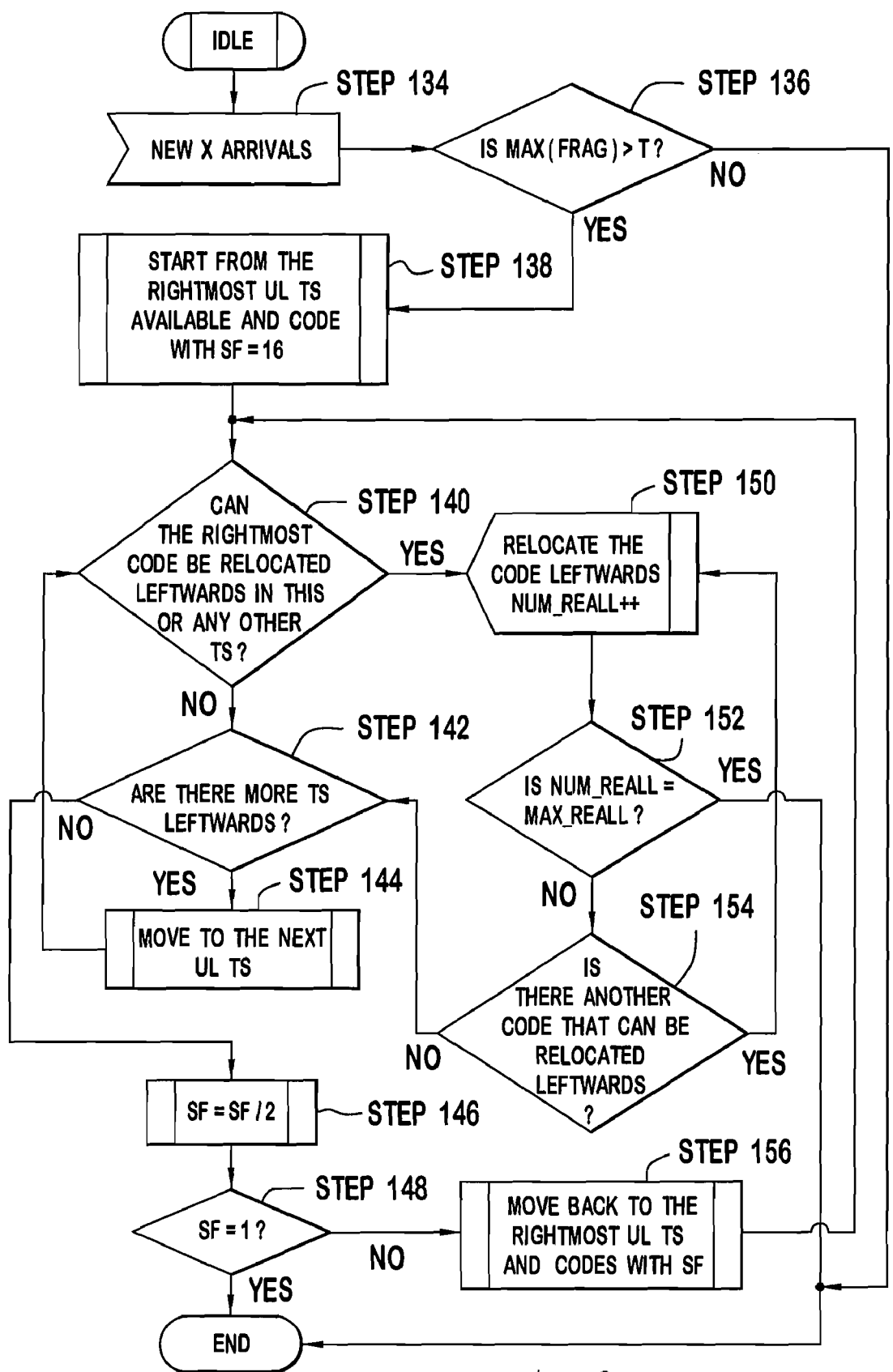
FIG. 8 is a flow chart of periodic code tree pruning.

FIG. 8 is another preferred algorithm for tree pruning. This algorithm acts only periodically and limits the maximum number of reallocations. Such an approach reduces the overall processing required. Additionally, the overhead associated with reassignment is also reduced. This algorithm also looks at the tree's code fragmentation. Code tree fragmentation is measure of the number of blocked codes within that tree. Although this approach is described with its preferred application in a slotted CDMA system, it can also be applied to non-slotted systems.

After a certain number of arrivals, such as "X", step 134, the algorithm is invoked. The algorithm initially looks at the fragmentation of the trees in each time slot. If at least one of the trees is fragmented more than a certain threshold, such as T, step 136, the algorithm starts pruning the trees with the lowest layer codes and from the rightmost timeslot and code, step 138. If a code can be reallocated to any other place to the left, step 150, the code is moved and a counter, such as tracked by a variable "Num_reall", that keeps track of the number of reallocations is updated. If the maximum number of reallocations is reached, step 152, the algorithm ends. If the maximum number of reallocations is not reached, the algorithm continues. After all the possible codes in the highest spreading factor are moved, steps 154 and 142, the algorithm moves up to the next highest spreading factor and repeats the same procedure, steps 146 and 148. The procedure is repeated for each lower spreading factor, unit the lowest spreading factor, steps 148, 156.

Variations to these code management schemes may also be used. Codes with a low SF can be allocated right-to-left, whereas codes with high SF can be allocated from left-to-right, thus concentrating codes for similar services in the same timeslots. The code tree pruning algorithms may also make use of the code management scheme in order to give priority to arrivals that request either a high or low SF.

Figure 9A:
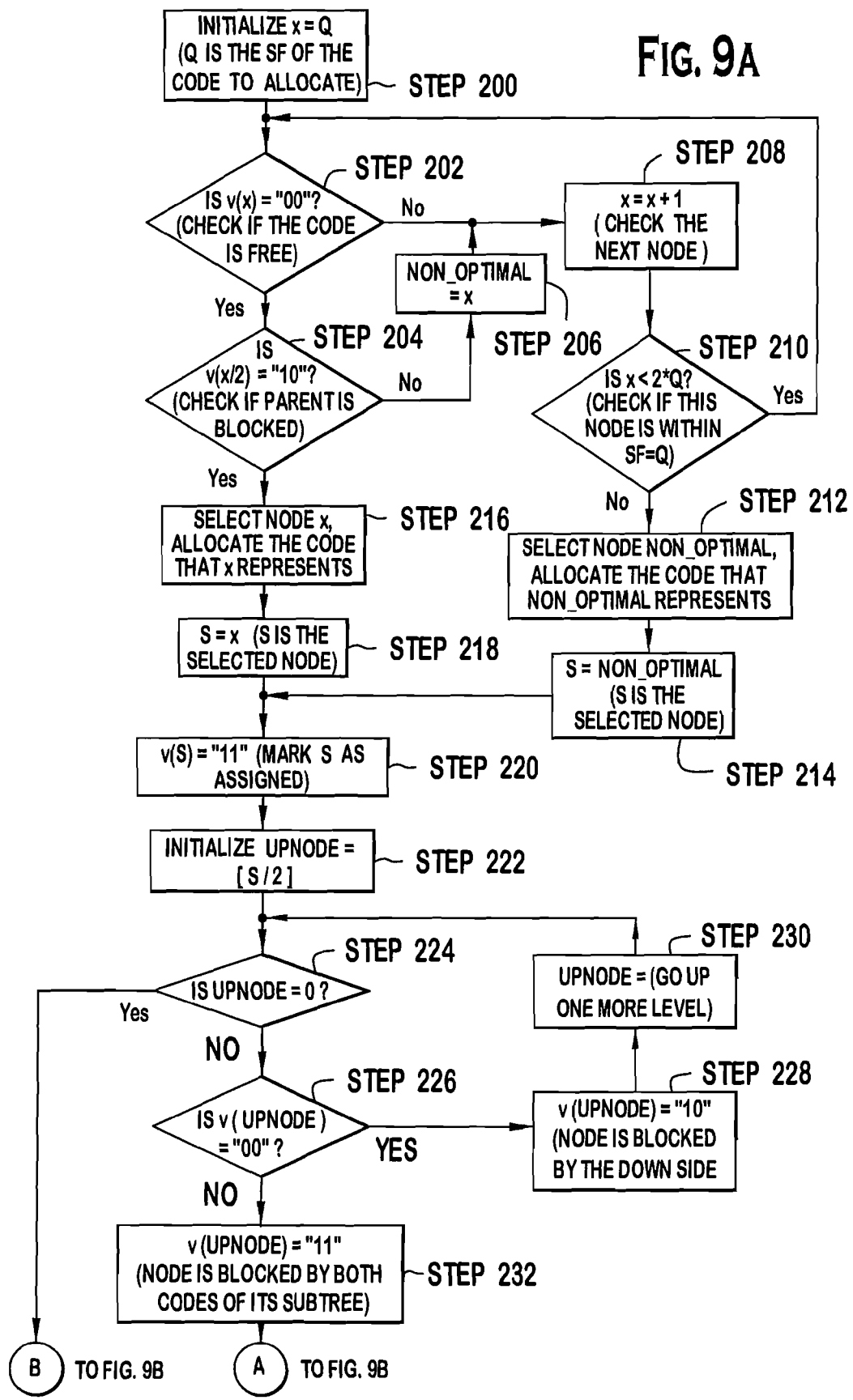
FIG. 9 is a flow chart of OVSF code assignment and code tree updating procedures.
Figure 9B:
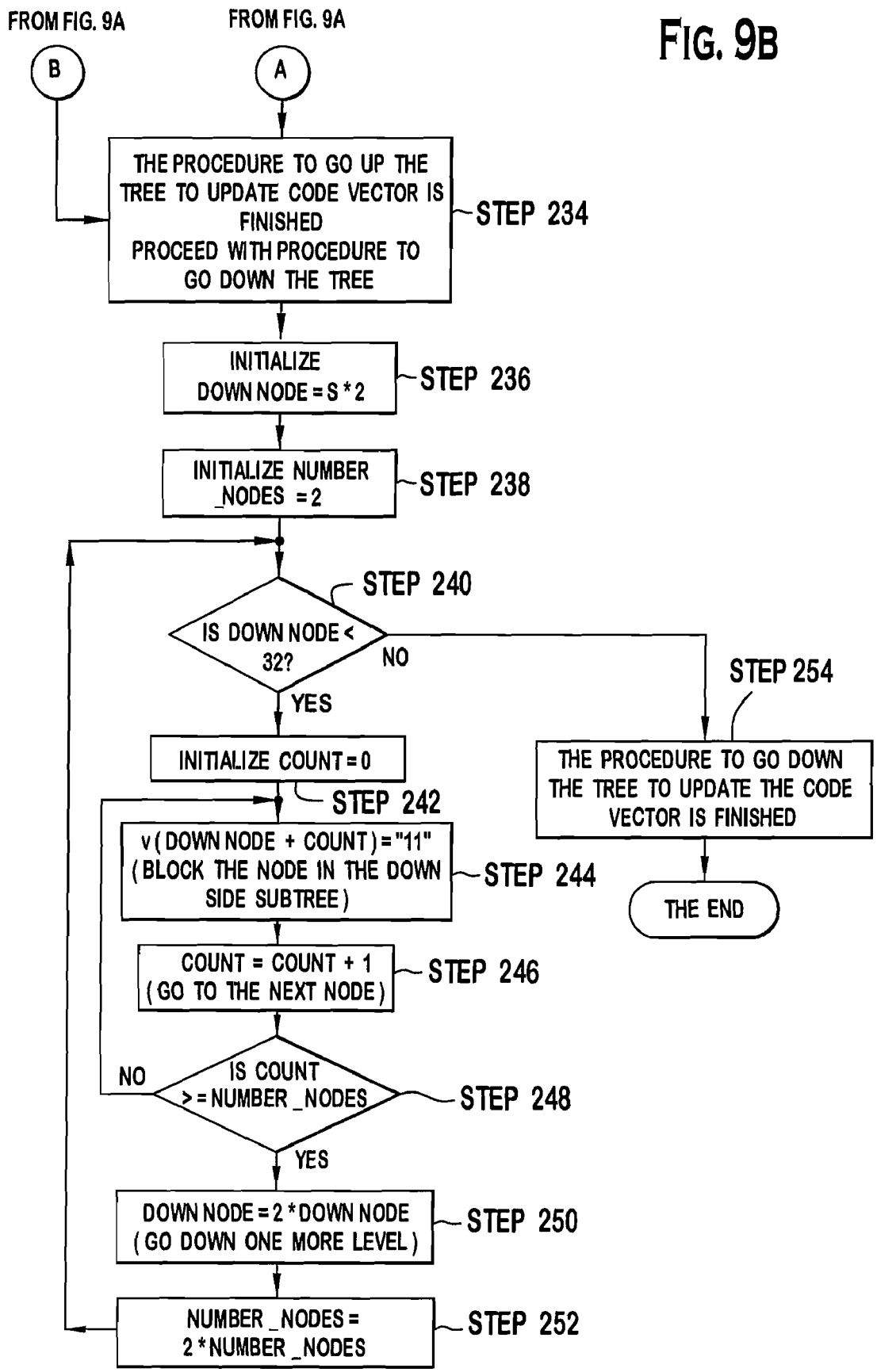

FIG. 9 is a preferred algorithm for assigning OVSF codes. A preferred use for this algorithm is in uplink code assignment for the TDD/CDMA, although the algorithm can be used for other applications. The preferred algorithm uses a code vector having two bit code status elements as previously described and the code tree of FIG. 4.

Initially, a variable, such as "x" is set to Q, where Q is the SF of the code requiring assignment, step 200. An initial node having that SF in the tree is checked to see if it is free (v(x)="00"), step 202. If it is, the parent node (the connected node having a lower spreading factor) is checked to see if it is blocked ("10"), step 204. If it is blocked, node x is assigned, step 216. A variable "S" representing the assignment is set to "x", step 218, and the algorithm proceeds to step 220.

If the parent node is not blocked, assigning that node may not be optimal ("non_optimal"="x"), step 206. The next node is checked (x=x+1), step 208. If the next node has the same SF (x<2*Q), step 210, the algorithm goes to step 202 to determine if that node is optimal or not. If not, the "non_optimal" node is selected for assignment, step 212. The variable "S" is set to "non-optimal", step 214, and the algorithm proceeds to step 220.

The element of node S is marked as assigned (v(S)="11"), step 220. The connected node having a SF lower than the assigned node is updated (Upnode=⌊s/2⌋), step 222. If UpNode=0, that indicates that all the nodes have been updated, step 224, and the algorithm proceeds to step 234. If not v(UpNode)="00", indicating that the node is available, step 226, that node is blocked (v(UpNode)="10"), step 228. The next higher node (having a lower SF) is checked (UpNode=⌊UpNode/2⌋, step 230. If v(UpNode)="11" (indicating that the node was blocked by one and now is blocked by two codes), step 232, the procedure to go up the tree is finished, step 234.

The algorithm proceeds to update down the tree (initialize DownNode=S*2), step 236. The number of nodes to be checked below the current node is two (initialize number_nodes=2), step 238. The algorithm checks to see that the bottom of the tree has not been passed (DownNode<32), step 240. If the bottom is passed, the update is complete, step 254. If the bottom was not passed, a count is initialized (initialize count=0), step 242. The node indicated by the count is blocked (v(DownNode+count)="11"), step 244. The algorithm increments the count and proceeds to the next node (count=count+1), step 248. If count is <number_nodes, step 248, the algorithm checks the next node and goes to step 244. If count is >=number_nodes, the algorithm checks on level lower in the tree (DownNode=2*DownNode), step 250. The nodes checked in the lower level is doubled (number_nodes=2*number_nodes), step 252.

Figure 10A:
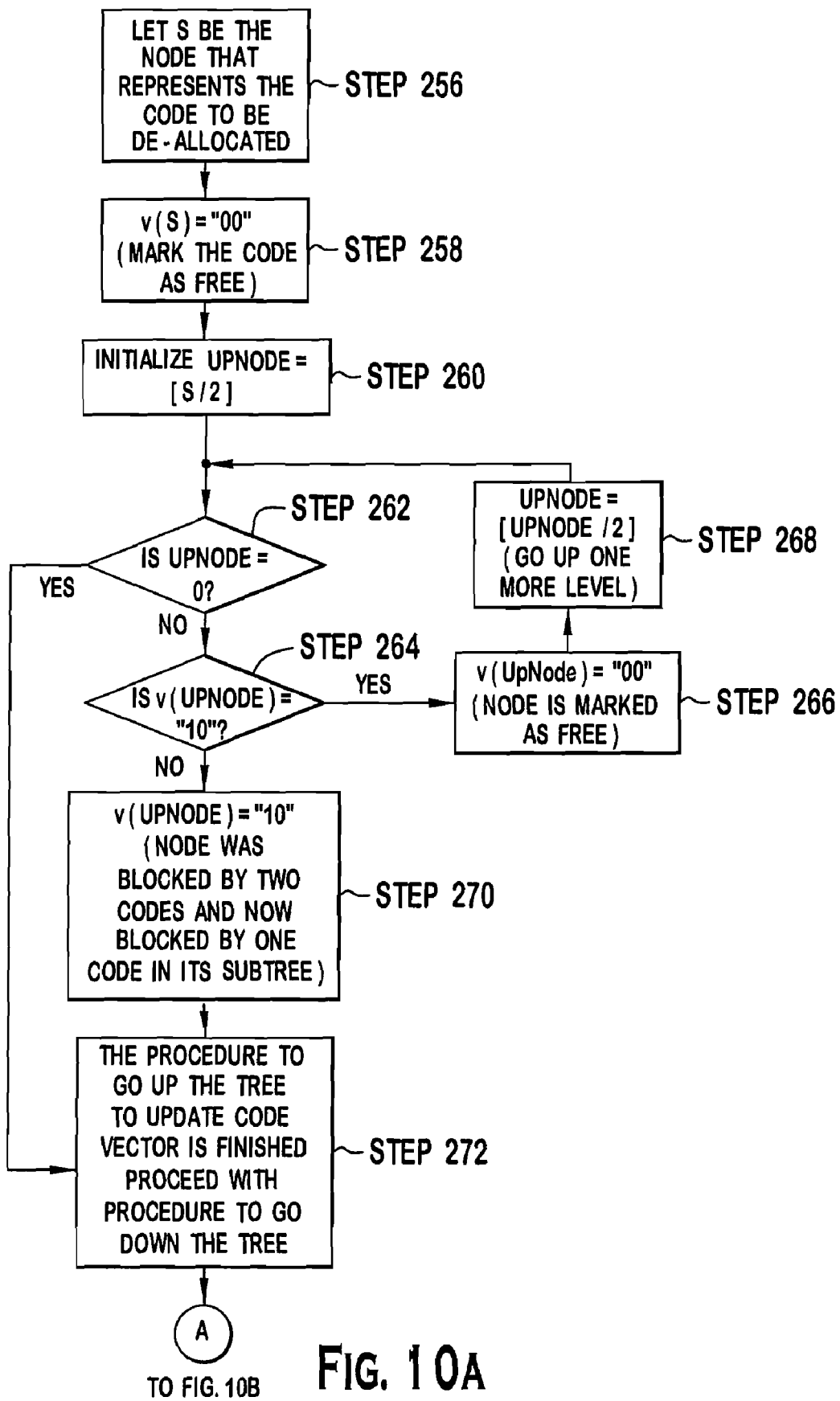
FIG. 10 is a flow chart of OVSF code de-allocation and code tree updating procedures.
Figure 10B:
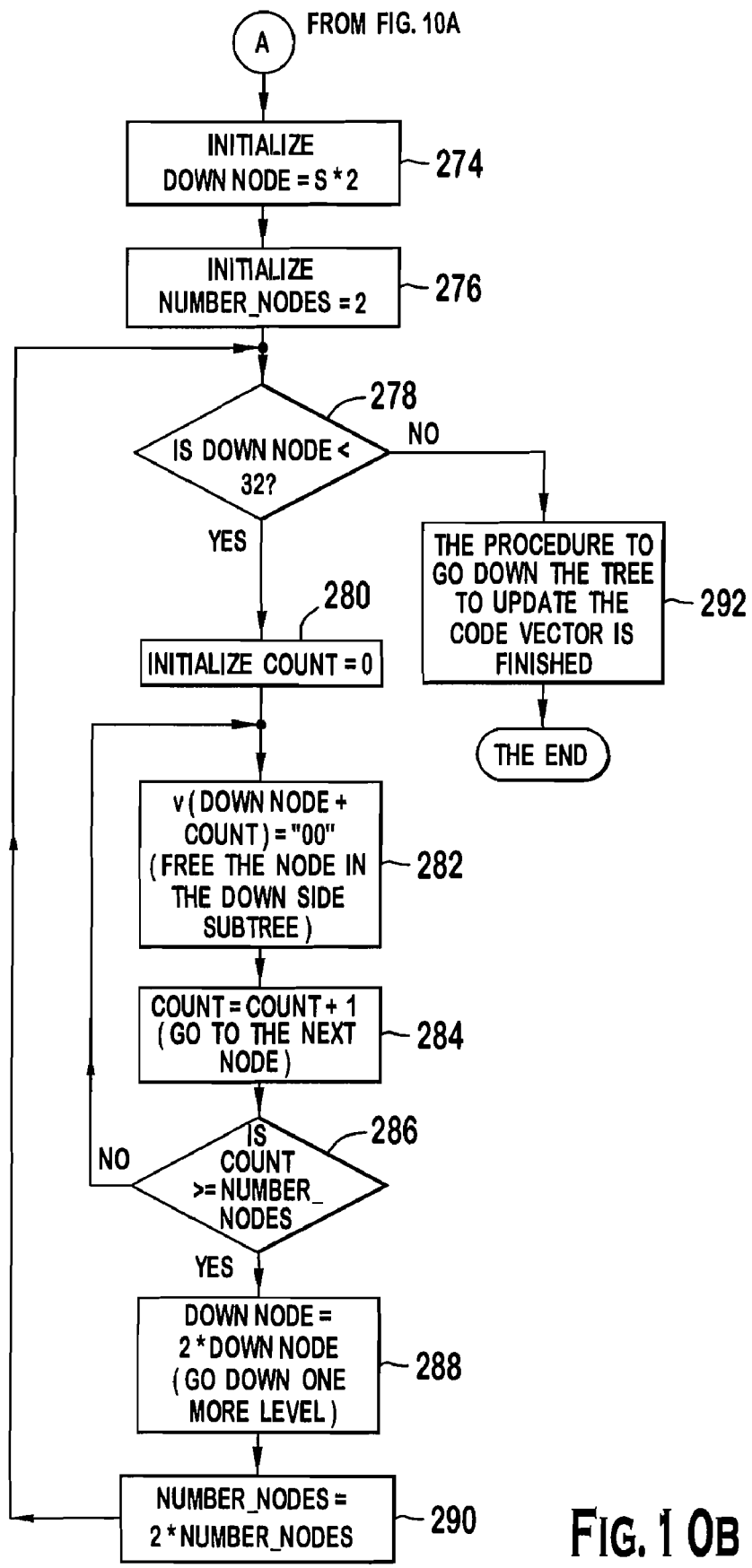

FIG. 10 is a preferred algorithm to update a tree after a code has been released (de-allocated). A variable "S" is set to the value of the node being de-allocated, step 256. That node, S, is marked as free (v(S)="00"), step 258. The nodes higher in the tree are updated (initialize UpNode=⌊s/2⌋), step 260. The algorithm checks to see if the top of the tree has not been passed (UpNode=0), step 262. If the top of the tree is passed, lower nodes in the tree are checked, step 272. If the top is not passed, the current node is blocked by one code (v(UpNode)="10"), step 264, that node is marked as being available (v(UpNode)="00"), step 266. The algorithm proceeds to check the next higher node in the tree (UpNode=⌊UpNode/2⌋), step 268, and the algorithm checks this node. If the node was blocked by two codes, it is set as being blocked by one node (v(UpNode)="10"), step 270.

To update down the tree, the "DownNode" variable is initialized (DownNode=S*2), step 274. The number of nodes to update below the node is initialized (number_nodes=2), step 276. If the bottom of the tree is passed (DownNode>=32), the tree has been updated, step 292. If not (DownNode<32), a count is initialized (count=0), step 280. The node indicated by the count is freed for assignment (v(DownNode+count)="00"), step 282. The count is incremented (count=count+1), step 284. If the number of nodes updated is not passed (count<number_nodes), the updating is repeated for the next count, step 286. If it is passed (count>=number_nodes), the next level down the tree is checked (DownNode=2*DownNode), step 288. The number of analyzed nodes in the lower level is twice that of the prior level (number_nodes=2*number_nodes), step 290, and the updating is repeated.

One embodiment of the invention relates to code assignment for the default midamble allocation scheme of the TDD mode of 3GPP W-CDMA. Midambles are part of the physical channel configuration for TDD. Different midamble allocation schemes exist for TDD. One is a WTRU specific midamble allocation, applying to both the uplink and downlink. For the WTRU specific midamble allocation, a specific midamble is explicitly assigned to all physical channels of a specific user. Another scheme is default midamble allocation, which also applies to both the uplink and downlink. For this scheme, the midamble used is determined by a pre-defined association between the midambles and the assigned channelization codes.

Another scheme is the common midamble allocation, which applies only to the downlink. In this scheme, a common midamble is allocated to all physical channels in a specific timeslot. For the WTRU specific and common midamble schemes, the codes may be assigned to users without considering the midamble assignment.

However, for the default midamble, the association between the midambles and the channelization codes is used in the code allocation scheme. Depending on the burst type and the value of Kcell, as defined by the standards, different associations apply. The burst type and the value of Kcell are individually configurable in the Radio Network Controller (RNC) for each timeslot by, for example, an operations and maintenance (O&M) function, or a function in the RNC such as radio resource management (RRM) dynamic channel allocation (DCA). The configuration is signaled to the WTRU via RRC signaling and, accordingly, the association is known by the WTRU.

For default midamble allocation, the association between midambles and channelization codes defines primary and secondary channelization codes. The following rules apply: each secondary channelization code is associated with a single primary channelization code; each secondary channelization code uses the same midamble as the primary channelization code with which it is associated; secondary codes can only be allocated if the associated primary code is also allocated; all channelization codes associated with the same midamble can only be allocated to the same WTRU; and for common and WTRU specific midamble allocations, all codes can be considered to be primary codes.

In order to perform code assignment for the default midamble scheme, each code is preferably given an additional flag indicating whether it is a primary or secondary channelization code, a midamble designation (which could also be called a code group designation) with one of Kcell different possible values (e.g., 0 through Kcell−1), and a tag to be used for the WTRU association.

Figure 11A:
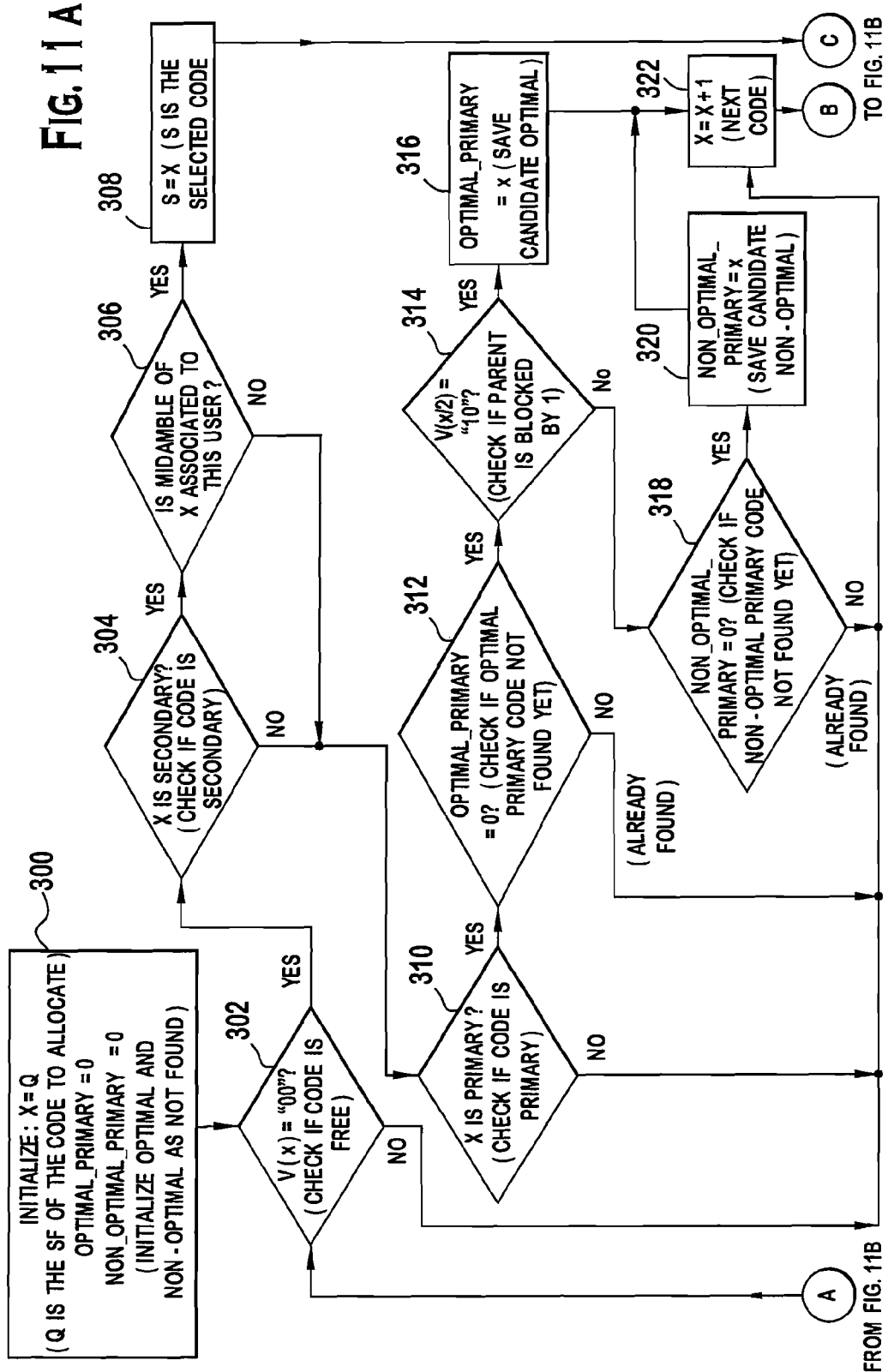
FIG. 11 is a flow chart modifying FIG. 8 for use with a default midamble code assignment scheme.
Figure 11B:
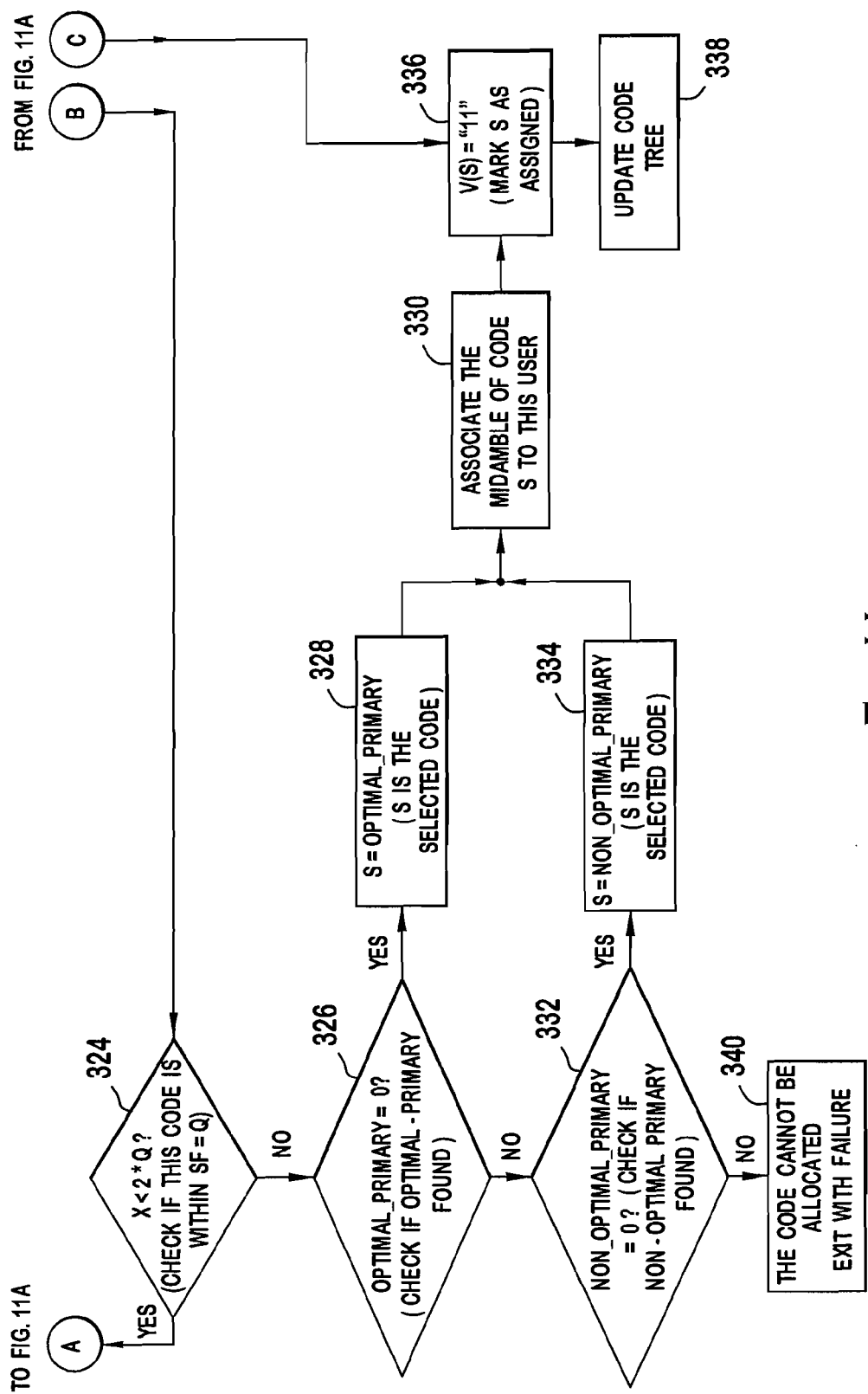

FIG. 11 is a flow chart for replacing steps 200-220 of FIG. 9 for use in allocating codes for the default midamble scheme. The tag for WTRU association could be provided for each channelization code or just for each midamble, since each code is already associated with a given midamble. The association with a midamble for a WTRU would imply association with that WTRU.

The procedure attempts to find the most optimal available code (code marked "00") for a given user (WTRU). The first (most desirable) choice is a secondary code associated with a midamble that is already assigned to the user. This type of code is classified as a class 1 code. The second choice is a primary code that has a parent, which is already blocked by one code (parent marked as "10"). This code is classified as a class 2 code. The third choice is a primary code that has a parent which is not blocked, which is classified as a class 3 code. Secondary codes associated with a midamble belonging to a different user would not be considered for assignment.

The most preferred algorithm scans from left to right, starting at the left-most code in the tree in that level, although other scanning directions may be used. For each available code, we determine which, if any, class it belongs to. If a class 1 is found, an immediate assignment is made. Otherwise, the left most codes in classes 2 and/or 3 are remembered for possible assignment in the case the scan ends without finding a class 1 code.

The following variables are used in the preferred algorithm: Optimal_Primary for a code in class 2 and Non_Optimal$_{13}$ Primary for a code in class 3. A variable, x, is initialized the value of the spreading factor, x=Q, step 300. Q is the SF of the code to allocate. Optimal_Primary and Non_Optimal_Primary are set to zero. The variable v(x) is checked to see if it equals "00", indicating that it is free, step 302. If x is a secondary code, step 304, and the midamble associated with code x is assigned to the user, step 306, the selected code S is set to x (S=x), step 308. Then, the algorithm jumps to step 336.

If x is not a secondary and is a primary, step 310, and Optimal_Primary=0, step 312, (an optimal code has not been found optimal yet), the left most primary code is saved as optimal for later use, if a secondary code is not found. The parent code is checked to see if it is blocked by one (v(x/2) ="10"), step 314. If it is, Optimal_Primary is set to the current x (Optimal_Primary=0), step 320, and the next code is checked (x=x+1), step 322. If the parent is blocked, a check is done to determine whether a non-optimal primary code is found (Non_Optimal_Primary=0), step 318. Subsequently, the next code is checked (x=x+1), step 322.

If the next code is within the same spreading factor, (x<2*Q), step 324, the procedure is repeated for the next code and the algorithm goes to step 302. If the next code is not in the same spreading factor, a check is done to see if an optimal primary code is found (Optimal_Primary=0), step 326. If an optimal primary has been found, the code is set to the optimal primary (S=Optimal_Primary), step 328. The midamble of the assigned code S is assigned to the user, step 330.

If a non-optimal primary is found (Non_Optimal_Primary=0), step 332, S is set to the non-optimal primary (S=Non_Optimal_Primary), step 334. The midamble of the assigned code S is assigned to the user, step 330. After the midamble is assigned, the assigned code is marked as being assigned (v(S)="11"), step 336, and the code tree is updated accordingly, step 338. If no secondary or primary codes are available, a code cannot be assigned, step 340.

Since the de-allocation procedure simply consists of updating the code tree, the previously described procedure for code de-allocation can be used in case of default midamble allocation with the addition of one step. After the completion of the de-allocation of a primary code, the midamble associated with that code would be disassociated from that user (WTRU).

Preferably, the entity that invokes the procedure after deciding which code to de-allocate (e.g., a Radio Resource Management function) ensures that a primary code is only de-allocated if all its secondary codes are not assigned. Optionally, a step could be added at the beginning of the de-allocation procedure to verify that a primary code is not being de-allocated when its associated secondary codes are still assigned. If any associated secondary is still assigned, the de-allocation procedure would exit and indicate a code assignment failure.

What is claimed is:

1. A method for reassigning codes of an orthogonal variable spreading factor code tree in code division multiple access communications to a new call, the code tree having a plurality of codes at differing spreading factors and having a plurality of branches between the codes of different spreading factors, if a particular code of the code tree is assigned, a lower spreading factor code of the code tree connected to that code by one of the branches is blocked from assignment, if a code of the code tree is blocked, a code of the tree of a lower spreading factor connected to that code by one of the branches is blocked from assignment, the method comprising:
   finding a code of a highest spreading factor in a time slot;
   determining if a leftward code of the highest spreading factor code in the time slot is available;
   relocating the new call into the leftmost available code in the time slot; and
   repeating, for a next lower spreading factor, finding a code of the next lower spreading factor in the time slot, determining if a leftward code is available in the time slot, and relocating the new call to the leftward available code.

2. The method of claim 1 in wireless communications using multiple time slots, and further comprising:
   for another time slot:
   finding a code of a highest spreading factor in the other time slot;
   determining if a leftward code of the highest spreading factor code in the other time slot is available;
   relocating the new call into the leftmost available code in the other time slot; and repeating, for a next lower spreading factor, finding a code of the next lower spreading factor in the other time slot, determining if a leftward code is available in the other time slot, and relocating the new call to the leftward available code in the other time slot.

3. The method of claim 2 wherein the other time slot is a time slot adjacent to the first time slot in a rightward direction.

4. The method of claim 1 further comprising:
stopping the method if the number of relocations reaches a predetermined number.

5. The method of claim 1 wherein the method is invoked when a predefined number of new call arrivals is received.

6. A method for reassigning codes of an orthogonal variable spreading factor code tree used in code division multiple access communications to a new call, comprising:
selecting a first code in the code tree of a highest spreading factor in a timeslot to be evaluated and assigning the first code to the new call;
searching a subsequent time slot if there are no available codes of that spreading factor in the first timeslot;
determining if the new call can be relocated to a different code in the spreading factor;
relocating the new call to the different code in the spreading factor, if possible;
selecting the next code in the spreading factor and repeating the determining; and
selecting a first code in the next lower spreading factor if there are no more codes in a current spreading factor, and repeating the determining.

7. The method according to claim 6, wherein the first code is a leftmost code in the tree.

8. The method according to claim 7, wherein the relocating includes relocating the new call to a code to the left in the tree.

9. The method according to claim 7, wherein the relocating includes relocating the new call to a code to the right in the tree.

10. The method according to claim 6, wherein the first code is a rightmost code in the tree.

11. The method according to claim 10, wherein the relocating includes relocating the new call to a code to the left in the tree.

12. The method according to claim 10, wherein the relocating includes relocating the new call to a code to the right in the tree.

13. The method according to claim 6, wherein the searching is not performed, whereby the method only reassigns the new call to a code within a single timeslot.

14. The method according to claim 6, wherein the method is performed for each new call.

15. The method according to claim 6, wherein the method is performed periodically.

16. The method according to claim 6, wherein the method limits the number of code reassignments to the new call.

17. The method according to claim 6, further comprising:
evaluating a fragmentation parameter of the code tree; and
performing the method if the fragmentation parameter exceeds a threshold.

* * * * *

UNITED STATES PATENT AND TRADEMARK OFFICE
CERTIFICATE OF CORRECTION

PATENT NO. : 7,471,713 B2
APPLICATION NO. : 12/124716
DATED : December 30, 2008
INVENTOR(S) : Zuniga et al.

It is certified that error appears in the above-identified patent and that said Letters Patent is hereby corrected as shown below:

IN THE SPECIFICATION

At column 1, line 18, before the words "such systems." delete "is" and insert therefor --in--.

At column 1, line 31, after the word "factors" delete "(OSVF)" and insert therefor --(OVSF)--.

At column 1, line 48, before the word "codes" delete "identity" and insert therefor --identify--.

At column 1, line 63, after the words "assigned and" delete "release" and insert therefor --released--.

At column 2, line 13, before the word "efficient" delete "and" and insert therefor --an--.

At column 2, line 35, before "OVSF" delete "a" and insert therefor --an--.

At column 2, line 38, before "OVSF" delete "a" and insert therefor --an--.

At column 2, line 61, after the word "using" delete "OSVF" and insert therefor --OVSF--.

At column 3, line 13, before the word "codes" delete "OSVF" and insert therefor --OVSF--.

At column 3, line 26, after "C16(1)" insert --as 31--.

At column 3, line 34, before "SF 16" delete "illustrates," and insert therefor --illustrate,--.

At column 4, line 26, after the word "having" delete "a" and insert therefor --an--.

At column 4, line 28, before the word "after" delete "for".

UNITED STATES PATENT AND TRADEMARK OFFICE
CERTIFICATE OF CORRECTION

PATENT NO.       : 7,471,713 B2
APPLICATION NO.  : 12/124716
DATED            : December 30, 2008
INVENTOR(S)      : Zuniga et al.

It is certified that error appears in the above-identified patent and that said Letters Patent is hereby corrected as shown below:

At column 4, line 63, after the words "fragmentation is" insert --the--.

At column 5, line 17, before the words "the lowest" delete "unit" and insert therefor --until--.

At column 5, line 49, after the word "having" delete "a" and insert therefor --an--.

At column 7, line 52, before the words "for a code" delete "mal$_{13}$Primary" and insert therefor --mal_Primary--.

Signed and Sealed this

Twenty-sixth Day of May, 2009

JOHN DOLL
*Acting Director of the United States Patent and Trademark Office*